May 26, 1970 W. E. TUPPER ET AL 3,513,872

ANTI-SYPHON VALVE

Filed Dec. 6, 1968

INVENTORS
WILLIS E. TUPPER
WARD A. TUPPER

BY *Olsen and Stephenson*

ATTORNEYS

United States Patent Office 3,513,872
Patented May 26, 1970

3,513,872
ANTI-SYPHON VALVE
Willis E. Tupper and Ward A. Tupper, Dexter, Mich., assignors to Dexter Automatic Products Co., Inc., Dexter, Mich., a corporation of Michigan
Filed Dec. 6, 1968, Ser. No. 781,945
Int. Cl. F16k 15/02
U.S. Cl. 137—484.2            10 Claims

ABSTRACT OF THE DISCLOSURE

A check valve for use in a liquid fuel system in the supply line between a tank and an internal combustion engine. The valve will hold a desired pressure head on the suction side and will prevent syphoning of fuel from the tank in the event of a rupture or a leak in the line between the check valve and the engine. The flow passageway through the valve is such that aeration of the fuel is avoided.

BACKGROUND OF THE INVENTION

The present invention relates to an anti-syphon valve for use in liquid fuel systems, and especially for such a valve which can be used in the fuel line from a fuel tank to a marine engine of a boat.

In fuel systems of this character, it is necessary to have a check valve above the fuel tank in the line between the tank and the engine. Normally, the valve must be capable of holding a minimum pressure head on the suction side, such as a two-foot head or the like, and the valve must also be capable of preventing syphoning of the fuel from the tank in the event a leak or rupture occurs in the line between the check valve and the engine.

The check valves which have been used in the past have satisfactorily performed these functions, but a serious defect has existed. It has been found that the check valves previously used in the fuel lines have frequently caused aeration of the fuel, which in turn has resulted in fautly engine performance, and in extreme conditions has also resulted in the engine being severely damaged because of lack of lubrication. As is known, it is customary when using certain types of internal combustion engines to include the lubricating oil in the fuel for the engine, and when aeration occurs, it is found that lubrication of the engine is inadequately provided.

The problem of aeration of the fuel occurs most frequently with check valves of the ball type, and appears to occur because of failure of the ball element to maintain a position wherein it is spaced a sufficient distance from the valve seat during the normal flow conditions of the fuel.

SUMMARY OF THE INVENTION

The present invention has been developed to overcome the foregoing shortcomings of the prior art. Accordingly, an anti-syphon valve has been developed which is constructed and arranged so that it can be used with internal combustion engines of a wide range of sizes, and when so used, will assure that the desired anti-syphon operations will be performed and at the same time, all problems heretofore encountered in connection with aeration of the fuel are avoided.

According to a preferred embodiment of the present invention, an anti-syphon valve for a liquid fuel system is provided having a body defining a flow passageway having inlet and outlet ends and a reduced bore spaced axially from the inlet end. A sleeve having a reduced end portion is fitted into the reduced bore of the passageway for supporting the sleeve with the remainder of the sleeve extending toward the inlet end and spaced radially inwardly from the flow passageway. A needle having one end positioned in the sleeve is provided for sliding axial movement therein, the other end of the needle projecting from the sleeve toward the inlet end of the passageway and terminating in a seating surface. The sleeve and the needle have cooperating abutment means limiting the extent of movement of the needle toward the reduced end portion of the sleeve for determining the open position of the needle. The sleeve has ports located axially between the abutment means and the reduced end portion of the sleeve providing the most restricted and the only path of flow for liquid fuel flowing through the passageway, from the space surrounding the sleeve through said reduced end portion to the outlet end of the body. A tubular insert is secured in the inlet end of the body and provides a seat for the seating surface of the needle to determine the closed position of the needle. Spring means are operatively positioned between the sleeve and the needle for urging the needle to its closed position. The ports in the sleeve have a relatively restricted transverse area to provide a pressure drop in the sleeve during flow of liquid fuel through the passageway so that the needle will be retained constantly in a fully open position because of the pressure differential acting on the opposite ends of the needle, thereby eliminating aeration of the flowing fluid.

Thus, it is an object of the present invention to provide an improved anti-syphon valve for a liquid fuel system which is constructed and arranged so as to provide desired anti-syphon properties and at the same time which will prevent aeration of the fuel when it flows through the passageway of the valve.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
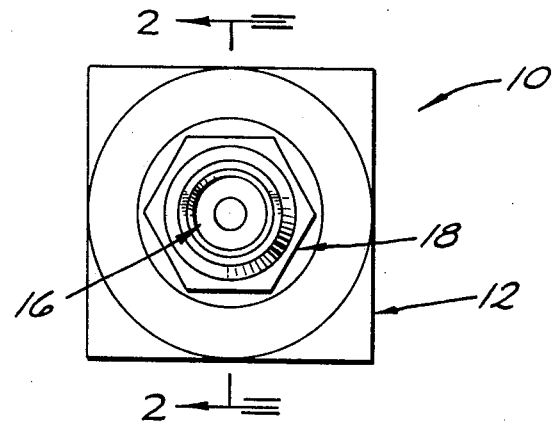
FIG. 1 is an end elevational view of an anti-syphon valve embodying one form of the present invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The check or anti-syphon valve 10 includes a body 12, a sleeve 14, a needle 16, an insert 18 and a spring means 20.

Figure 2:
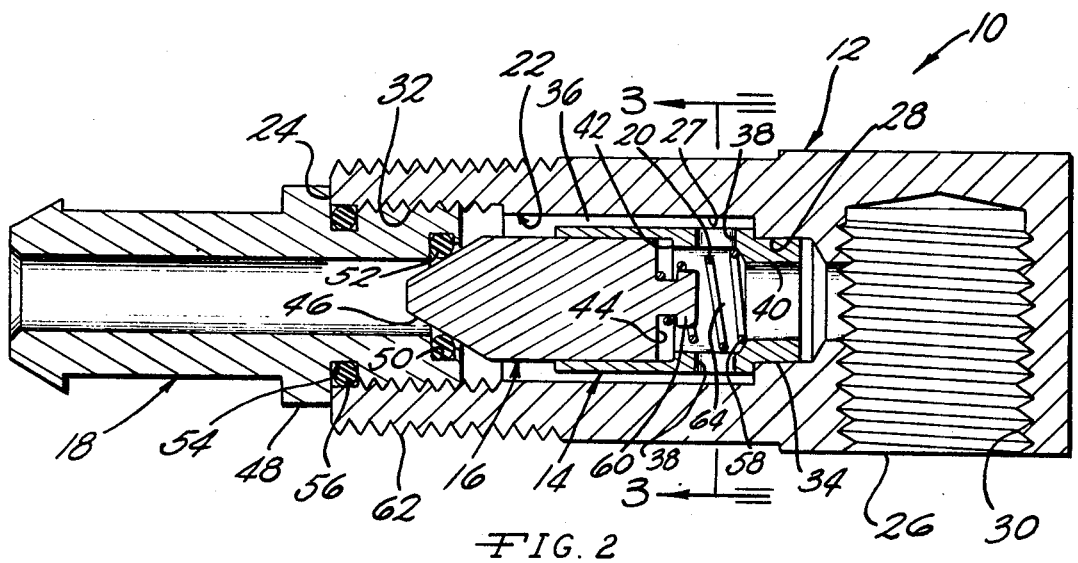
FIG. 2 is a longitudinal section taken on the line 2—2 of FIG. 1.
Figure 3:
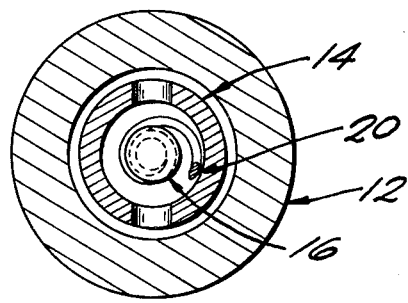
FIG. 3 is a transverse section taken on the line 3—3 of FIG. 2.

The body 12 has a passageway 22 therethrough starting at the inlet end 24 and terminating at the outlet end 26. The passageway 22 includes a cylindrical bore 27 extending inward from the inlet end 24 to the reduced bore 28 which is in communication with the transversely extending outlet bore 30. As can be seen best in FIG. 2, the outlet bore 30 is internally threaded for receiving a suitable attachment fitting. The inlet end of the bore is similarly internally threaded for receiving a fitting at the inlet end as is shown at 32.

The sleeve 14 has a generally cylindrical outer surface which is provided with a reduced end portion 34 which is securely fitted into the reduced bore 28 by a suitable supporting arrangement, such as by a press fit. It will be observed that the outer circumference of the sleeve 14 is cylindrical and is spaced from the inner wall of the passageway 22 to provide an annular passage for the flow of fluid at 36. A pair of diametrically opposed ports 38 are provided in the sleeve 14 adjacent to the reduced portion 34 so that the fluid flowing through the passage 36 can flow into the interior of the sleeve 14 for discharge therefrom through the outlet 40 of reduced internal diameter. The sleeve 14 also has an annular shoulder 42 located in axially spaced relation from the outlet end 40 so that the ports 38 are between such shoulder 42 and the outlet 40.

The needle 16 is positioned within the sleeve 14 and is axially movable therein. The needle 16 has an exterior wall in engagement with the interior wall of the sleeve 14 to prevent the normal flow of fluid between needle 16 and the sleeve 14. The needle 16 has an end wall portion 44 adapted to seat against the annular shoulder 42, and the end portion 44 and the annular shoulder 42 thereby provide abutment means to limit the extent of movement of the needle 16 toward the outlet end 40 of the sleeve. The one end of the needle 16 which projects outwardly from the sleeve 14 has a conical surface 46 which provides a seating surface for the needle valve element 16 when in its closed position.

Threadedly connected to the inner surface 32 of the body 12 is the tubular insert 18 which has an annular shoulder 48 for engaging the end 24 when screwing the insert into the body 12. The insert 18 has an annular slot 50 at its inner end in which is seated an O-ring 52 which provides a seat for the conical surface 46 of the needle 16. The insert 18 also has an annular groove 54 in which is seated an O-ring 56 to provide a seal between the exterior surface of the insert 18 and the inner wall of the body 12 to prevent leakage of fuel. The insert 18 also has an outer configuration so that a flexible hose can be fitted over the insert 18 for normal use of the valve 10. It will be noted that the annular shoulder 48 also serves to locate the O-ring or seat 56 a prescribed distance from the annular shoulder 42 in sleeve 14, thereby accurately establishing the location of the needle 16 in its open and closed positions, and also accurately establishing the size of the opening at the valve seat when the needle is in its open position. Maintaining the opening a proper dimension is a significant feature of the present invention which results in the elimination of aeration of the fuel.

Positioned within the sleeve 14 is a small hair or coil spring 20 which is seated against the end wall of the needle 16 and is also seated against the shoulder 58 which is defined by the reduced end portion at the outlet 40. The spring 20 functions to urge the needle 16 into seated position against the O-ring 52. It will be noted that the needle 16 has a head portion 60 over which the one end of the coil spring 20 is fitted. This construction and arrangement is provided to facilitate assembly of the valve 10. It will be recognized that problems of aligning the spring 30 might be encountered during the assembly operations, but this is avoided by the construction and arrangement shown, because the spring 20 can be fitted on the end of the needle 16 prior to assembly, and thereafter, when the needle 16 is inserted in the sleeve 14 during the assembly operations, the spring 20 will be retained at an axial position so that it will be seated against the shoulder 58 during this operation.

In use, the valve 10 normally will be fitted in a threaded fitting in the top wall of a fuel tank, not shown, by means of the threaded portion 62 on the external side of the body 12. A hose, not shown, will be fitted to the external surface of the insert 18 so that it can descend to the bottom of the fuel tank. The outlet end 26 will have a fuel line, not shown, threadedly connected therein which will lead to the internal combustion engine for supplying fuel thereto. Normally the valve 10 will be in a vertical position and the needle 16 will be in the closed position shown in FIG. 2. When the internal combustion engine is started, the vacuum created in the line to the valve 10 will cause the needle 16 to be unseated and fuel will then flow upwardly through the insert 18, between the conical surface 46 and the O-ring 52, through the annular space 36, through the ports 38 and the outlet 40 and out of the valve body via the outlet end 26 to the engine. It will be noted that the only path of flow for the fuel will be through the sleeve 14 via the ports 38, and the ports 38 have effective cross sectional area of a dimension so that a pressure drop will exist within the sleeve in the region 64, and this pressure drop, which will exist at all times during the flow of the fuel, will cooperate with the normal suction in the fuel line resulting from operation of the engine to hold the needle 16 continuously against the shoulder 42, thereby assuring that adequate spacing exists between the conical surface 46 and the O-ring 52 to avoid aeration of the fuel at this location. It is believed that the location where the aeration of the fuel occurs in the prior art devices is at a region between the movable valve element and the valve seat. In the present invention a unique arrangement has been provided to assure that the movable valve element 16 remains a proper distance away from the valve seat 52 during all operating conditions.

Thus, by virtue of the described construction, an anti-syphon valve for a liquid fuel system has been provided which has eliminated the problems existing and which are inherent with many of the check valves previously used in this field. The valve 10 can be used with a variety of engines having different capacities so that a variety of different suction pressures are exerted on the fuel line while still assuring uniform and continuous operation of the desired characteristics.

What is claimed is:

1. An anti-syphon valve for a liquid fuel system comprising a body defining a flow passageway having inlet and outlet ends and a reduced bore spaced axially from the inlet end, a sleeve having a reduced end portion fitted into the reduced bore of said passageway with the remainder of the sleeve extending toward said inlet end and spaced radially from the flow passageway, a needle having one end positioned in said sleeve for sliding axial movement, the other end of said needle projecting from the sleeve toward said inlet end and terminating in a seating surface, said sleeve and said needle having cooperating abutment means limiting the extent of movement of said needle toward the reduced end portion of said sleeve and for determining the open position of said needle, said sleeve having port means located axially between said abutment means and the reduced end portion of said sleeve providing the only path of flow for liquid flowing from the space surrounding said sleeve through said reduced end portion to the outlet end of said body, a tubular insert secured in said inlet end and providing a seat for the seating surface of the needle to determine the closed position of said needle, spring means operatively positioned between said sleeve and said needle for urging said needle to its closed position, said port means having a relatively restricted transverse area to provide a pressure drop in said sleeve during flow of liquid fuel through said passageway so that said needle will be retained constantly in its fully open position during flow conditions to eliminate aeration of the flowing fluid.

2. An anti-syphon valve as defined by claim 1, wherein said sleeve is rigidly secured in said body by a press-fit connection between said reduced end portion and said reduced bore.

3. An anti-syphon valve as defined by claim 1, wherein said other end of the needle terminates in a conical surface, and said tubular insert includes a resilient O-ring against which said conical surface is seated when said needle is in its closed position.

4. An anti-syphon valve as defined by claim 1, wherein said cooperating abutment means comprises an annular inwardly projecting shoulder in said sleeve and an end wall portion of the needle adapted to seat on said shoulder.

5. An anti-syphon valve as defined by claim 1, wherein said insert includes a radially outwardly projecting collar for engagement with the inlet end of said body so as to establish the position of said seat for the needle.

6. An anti-syphon valve as defined by claim 1, wherein said insert projects from said body and defines on its outer surface a hose fitting.

7. An anti-syphon valve as defined by claim 1, wherein said port means comprises a pair of diametrically opposed radially inwardly directed apertures extending through said sleeve.

8. An anti-syphon valve as defined by claim 1, wherein said outlet end is defined by an internally threaded bore disposed normal to said reduced bore.

9. An anti-syphon valve as defined by claim 1, wherein the internal diameter of said reduced end portion is less than that of the sleeve where said port means are located, said spring means being positioned between the end of the needle and the shoulder defined by the reduced end portion.

10. An anti-syphon valve as defined by claim 9, wherein said needle includes an axial projection defining a coil spring retainer, and said spring means comprises a coil spring one end of which is mounted on said retainer.

References Cited

UNITED STATES PATENTS

| | | | |
|---|---|---|---|
| 1,775,833 | 9/1930 | Schneider | 137—543.19 X |
| 3,134,394 | 5/1964 | Ohta | 137—484.2 X |
| 3,356,103 | 12/1967 | Biello et al. | 137—515.5 |

M. CARY NELSON, Primary Examiner

R. B. ROTHMAN, Assistant Examiner

U.S. Cl. X.R.

137—543.19